(12) United States Patent
DesJarlais et al.

(10) Patent No.: US 6,382,950 B1
(45) Date of Patent: May 7, 2002

(54) COIL WINDING MACHINE

(75) Inventors: Matthew G. DesJarlais; Walter D. Klassen, both of Winnipeg (CA)

(73) Assignee: Gateway Bookbinding Systems, Inc., Winnipeg (CA)

( * ) Notice: Subject to any disclaimer, the term of this patent is extended or adjusted under 35 U.S.C. 154(b) by 0 days.

(21) Appl. No.: 09/677,379

(22) Filed: Sep. 27, 2000

(51) Int. Cl.$^7$ ................................................ B21C 47/02

(52) U.S. Cl. ........................ 425/193; 425/391; 425/363; 425/302.1; 425/DIG. 7

(58) Field of Search .............................. 425/302.1, 319, 425/320, 321, 322, 391, 392, 393, 363, DIG. 7, 193; 72/139, 142, 145; 140/92.94

(56) References Cited

U.S. PATENT DOCUMENTS

| | | | |
|---|---|---|---|
| 3,262,157 A | * 7/1966 | Fujisaki | 24/391 |
| 4,325,184 A | * 4/1982 | Omori | 29/766 |
| 4,501,547 A | * 2/1985 | Mizuhara et al. | 425/319 |
| 6,190,156 B1 | * 2/2001 | Primeau et al. | 242/444 |

OTHER PUBLICATIONS

Brochure—PVC Spiral Supply—Problem Solvers, Boise, Idaho (1 page).

Brochure—Spiral Forming—Renz of Heubach, Germany (1 page).

* cited by examiner

*Primary Examiner*—Nam Nguyen
*Assistant Examiner*—Joseph S Del Sole
(74) *Attorney, Agent, or Firm*—Adrian D. Battison; Michael R. Williams; Ryan W. Dupuis (57) ABSTRACT

A machine for forming helical coil comprises an elongate cylindrical mandrel which is rotatable about its longitudinal axis, a stationary helical guide coil wrapped around the mandrel and defining a helical guide path around the mandrel between turns of the guide coil into which path the material is guided. At least two drive rollers parallel to the axis of the mandrel which are rotatable each about a respective longitudinal axis. A drive coupling member at one end of the mandrel for receiving a drive from a rotatable drive member. A mounting boss for supporting the mandrel so as to allow rotation of the mandrel while holding the mandrel against longitudinal movement, a coil support plate having one edge attached to the turns of the helical guide coil so as to support the helical guide coil along its length with the plate extending outwardly of the axis of the mandrel.

18 Claims, 6 Drawing Sheets

COIL WINDING MACHINE

This invention relates to a machine for winding coils primarily for plastic helical bookbinding coils for insertion in the aligned holes at the edge of a book for binding the book.

BACKGROUND OF THE INVENTION

It is well known that collated books are often bound using a helical coil which passes through aligned holes at one edge of the book. This provides a book which can be easily opened and held at an opened position and is therefore particularly effective for manuals and reference materials.

The helical coil at the edge of the book can be formed from a coiled wire or a coiled strip of plastic material. The coiled wire has the significant advantage that it can be more easily inserted. The helical plastic coil has the advantages that it can be manufactured in different colours and therefore provides a particularly attractive appearance as opposed to the strictly utilitarian appearance of the steel wire.

Currently helical coils are produced by rotating the plastic material on a mandrel. The material is heated in order to adopt the diameter and pitch achieved by the mandrel. Mandrels are commonly an elongate rod which has a stationary coil guide that guides the material along the rod such that the material adopts the pitch of the coil guide and the diameter of the rod. Many different sized diameters and pitches can be required by a factory producing coiled books. Currently used mandrels have to be changed with a different mandrel to produce coils with a different pitch. Mandrels can be difficult and expensive to make and if a company needs to produce many different varieties of coils they must have a different mandrel for each application.

SUMMARY OF THE INVENTION

It is one object of the present invention to provide a machine for forming helical coil from a heated elongate plastics material comprising:

- an elongate cylindrical mandrel onto which the material is wrapped in helical formation which is rotatable about its longitudinal axis;
- a stationary helical guide coil wrapped around the mandrel and defining a helical guide path around the mandrel between turns of the guide coil into which path the material is guided for setting into a helical shape having a diameter determined by the diameter of the mandrel and a pitch determined by the pitch of the guide coil;
- at least two drive rollers parallel to the axis of the mandrel which are rotatable each about a respective longitudinal axis for applying an outer driving force to an outside of the helical coil of plastics material while it is wrapped around the mandrel and while the mandrel applies an inner driving force to the inside of the helical coil of plastics material such that the inner and outer forces tend to drive the material helically along the mandrel from a supply to a discharge end of the mandrel;
- a drive coupling member at one end of the mandrel for receiving a drive from a rotatable drive member;
- a mounting boss for supporting the mandrel so as to allow rotation of the mandrel while holding the mandrel against longitudinal movement;
- a coil support plate having one edge attached to the turns of the helical guide coil so as to support the helical guide coil along its length with the plate extending outwardly of the axis of the mandrel;
- and a support member for supporting the coil support plate at positions along its length;
- the support plate being readily releasably connected to the support member so that the guide coil and the coil support plate can be removed leaving the mounting boss and support member in place for ready replacement of the guide coil by a guide coil of a different pitch.

Preferably the coil support plate has a thickness substantially equal to that of the guide coil allowing it to be welded to the guide coil.

Conveniently the support plate has a width from the edge attached to the coil to an opposed edge sufficient to define a cooling fin for applying cooling to the material on the mandrel.

Conveniently the support member is attached to the support plate at an edge opposite to the edge attached to the guide coil.

Conveniently the support member is attached to the support plate by spacer members which hold the support plate separated from the support member for allowing cooling of the support plate.

Conveniently the support member comprises an elongate bar.

Preferably the support member is attached to the mounting boss.

Preferably the drive coupling comprises a shaft having a non-circular cross-section insertable into a drive receptacle of corresponding cross-section to receive drive therefrom.

Preferably the drive coupling has a shoulder for abutting the mounting boss so that the mandrel is inserted through the mounting boss from the end opposite the drive coupling until the shoulder engages the mounting boss to hold the mandrel against longitudinal movement.

Conveniently the drive rollers consist only of two rollers arranged at opposite sides of the mandrel, each roller being mounted for movement between a drive position and a retracted position on a pivot arm with the pivot arms extending to respective pivot axes parallel to the mandrel axis and spaced outwardly from the mandrel to the same side.

Preferably the pivot arms are connected for simultaneously rotation about the respective pivot axis.

Conveniently the rollers are driven by a belt arrangement wrapped around both of the rollers, around a first pulley and a second pulley lying to the same side as the pivot axes with one pulley inwardly of and one outwardly of the pivot axes such that the rollers can pivot to the retracted position while the belt remains tensioned.

Conveniently a first of the pivot arms is pivotal by a manually operable pivot lever attached thereto and the second pivot arm is driven from the first.

Preferably there is provided an elongate cooling air supply mounted parallel to the mandrel and located at a position so as to direct air in a plane at right angles to a plane containing the drive rollers.

According to a second aspect of the invention there is provided a machine for forming helical coil from a heated elongate plastics material comprising:

- an elongate cylindrical mandrel onto which the material is wrapped in helical formation which is rotatable about its longitudinal axis;
- a stationary helical guide coil wrapped around the mandrel and defining a helical guide path around the mandrel between turns of the guide coil into which path the material is guided for setting into a helical shape having a diameter determined by the diameter of the mandrel and a pitch determined by the pitch of the guide coil;

at least two drive rollers parallel to the axis of the mandrel which are rotatable each about a respective longitudinal axis for applying an outer driving force to an outside of the helical coil of plastics material while it is wrapped around the mandrel and while the mandrel applies an inner driving force to the inside of the helical coil of plastics material such that the inner and outer forces tend to drive the material helically along the mandrel from a supply to a discharge end of the mandrel;

a drive coupling member at one end of the mandrel for receiving a drive from a rotatable drive member;

a mounting boss for supporting the mandrel so as to allow rotation of the mandrel while holding the mandrel against longitudinal movement;

a coil support plate having one edge attached to the turns of the helical guide coil so as to support the helical guide coil along its length with the plate extending outwardly of the axis of the mandrel;

wherein the drive rollers consist only of two rollers arranged at opposite sides of the mandrel, each roller being mounted for movement between a drive position and a retracted position on a pivot arm with the pivot arms extending to respective pivot axes parallel to the mandrel axis and spaced outwardly from the mandrel to the same side.

According to a first aspect of the invention there is provided a machine for forming helical coil from a heated elongate plastics material comprising:

an elongate cylindrical mandrel onto which the material is wrapped in helical formation which is rotatable about its longitudinal axis;

a stationary helical guide coil wrapped around the mandrel and defining a helical guide path around the mandrel between turns of the guide coil into which path the material is guided for setting into a helical shape having a diameter determined by the diameter of the mandrel and a pitch determined by the pitch of the guide coil;

at least two drive rollers parallel to the axis of the mandrel which are rotatable each about a respective longitudinal axis for applying an outer driving force to an outside of the helical coil of plastics material while it is wrapped around the mandrel and while the mandrel applies an inner driving force to the inside of the helical coil of plastics material such that the inner and outer forces tend to drive the material helically along the mandrel from a supply to a discharge end of the mandrel;

a drive coupling member at one end of the mandrel for receiving a drive from a rotatable drive member;

a mounting boss for supporting the mandrel so as to allow rotation of the mandrel while holding the mandrel against longitudinal movement;

a coil support plate having one edge attached to the turns of the helical guide coil so as to support the helical guide coil along its length with the plate extending outwardly of the axis of the mandrel;

and a cutting knife assembly for cutting the helical coil into lengths, the cutting knife assembly having;

a main body positioned at the discharge end of the mandrel opposite the mounting boss;

an opening on the main body facing the mandrel and is aligned with the axis of the mandrel;

an outer edge of the opening facing towards the axis of the mandrel;

a first portion on the outer edge having a chamfered edge for receiving the coil such that the coil is centred on the outer edge;

a second portion of the outer edge having a flat edge, and;

a cutting member being bevelled on a side facing away from the opening and a second side adjacent the opening;

the cutting member is arranged to move across the opening such that the cutting member forces the coil from the first portion to the second portion whereby the coil is cut to the desired length.

Preferably the cutting member is pivotally mounted to the main body below the opening.

Preferably the cutting member moves across the opening from side to side.

An advantage of the present invention is that the mandrel has interchangeable guide coils so that the pitch of the coil can be changed easily.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Referring to the accompanying drawings, there is illustrated a coil winding machine, generally indicated by 1, is arranged to wind coils primarily plastic helical bookbinding for insertion in aligned holes at an edge of a book for binding the book.

The machine has a main body 3 which is supported to a work structure, not shown, by a frame 5. The main body is rectangular in shape having a first end 7 mounted to the frame such that the main body is supported in a vertical manner. Rotatably mounted to the frame located below the main body is a horizontal shaft 9 which is rotated about a horizontal axis 11 by a motor, not shown. The shaft is coupled to the frame such that respective ends of the shaft extend beyond the sides of the main body and a pair of pulleys 13 are mounted thereon. Each pulley is mounted to a respective end of the shaft and each pulley is arranged to drive a belt 14. A pair of bushings 15 support the shaft to the frame at respective ends of the shaft for prohibiting longitudinal movement of the shaft thereon.

The main body has a top end 19 which is arranged to receive a mounting boss 21. The mounting arrangement supports a mandrel 23 in which a plastic material is wrapped in helical formation. The mandrel is rotated about a longitudinal axis 25 by the motor, the axis of the mandrel is parallel to the axis of the shaft. The motor drives the mandrel by rotating a pulley, not shown, wherein a belt 14A extends from the first pulley to a driven pulley 29 located on a respective side of the main body opposite the mandrel.

Figure 1:
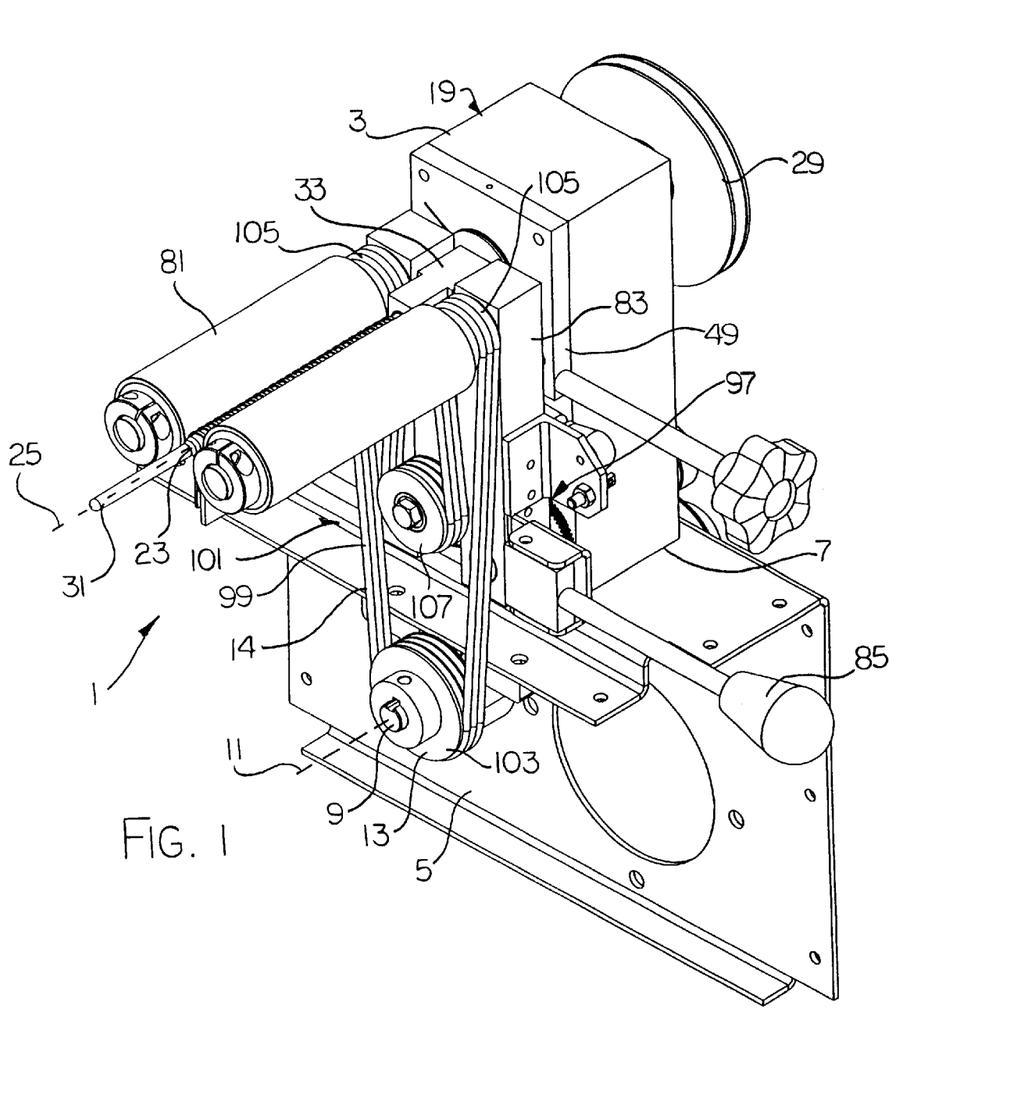
FIG. 1 is an isometric view of the machine.
Figure 2:
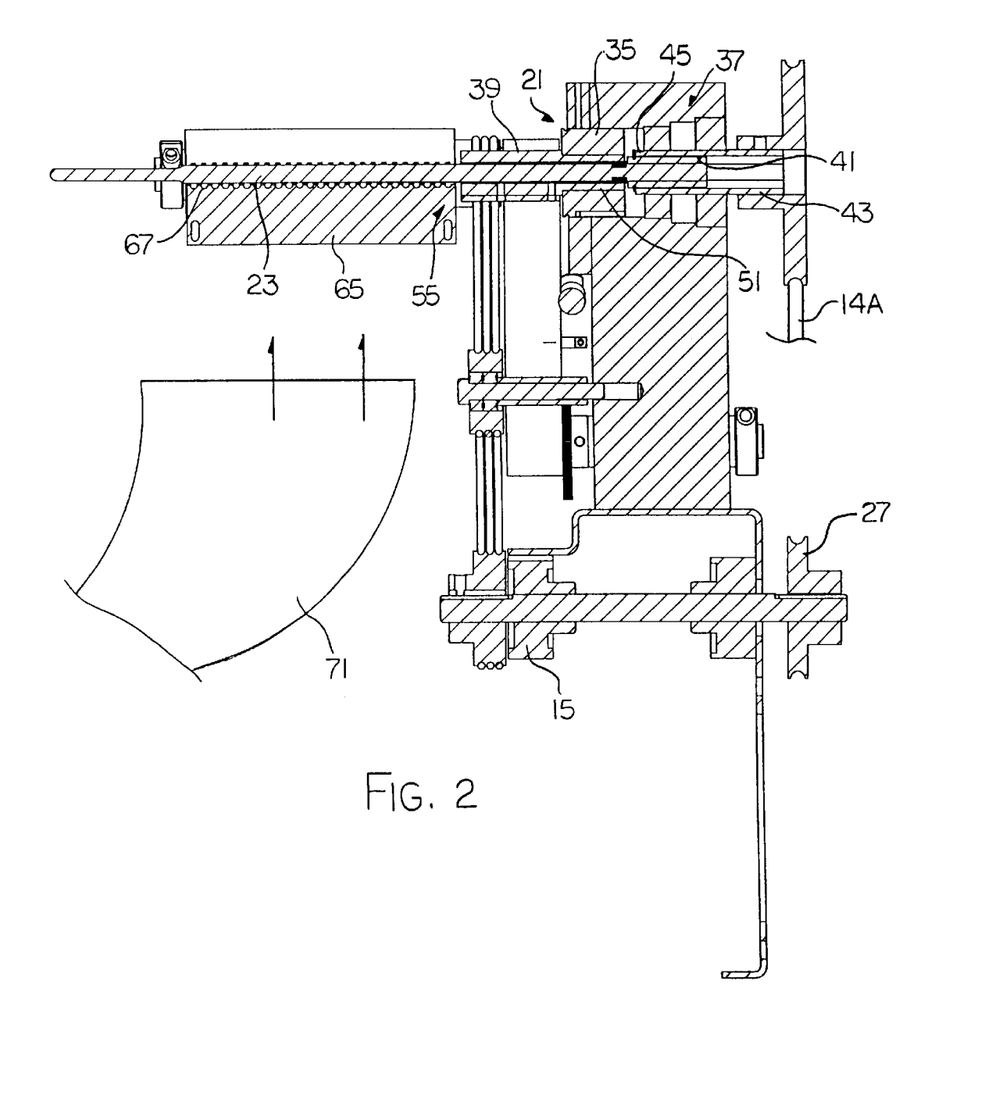
FIG. 2 is a vertical cross section along the lines 2—2 of FIG. 1.
Figure 3:
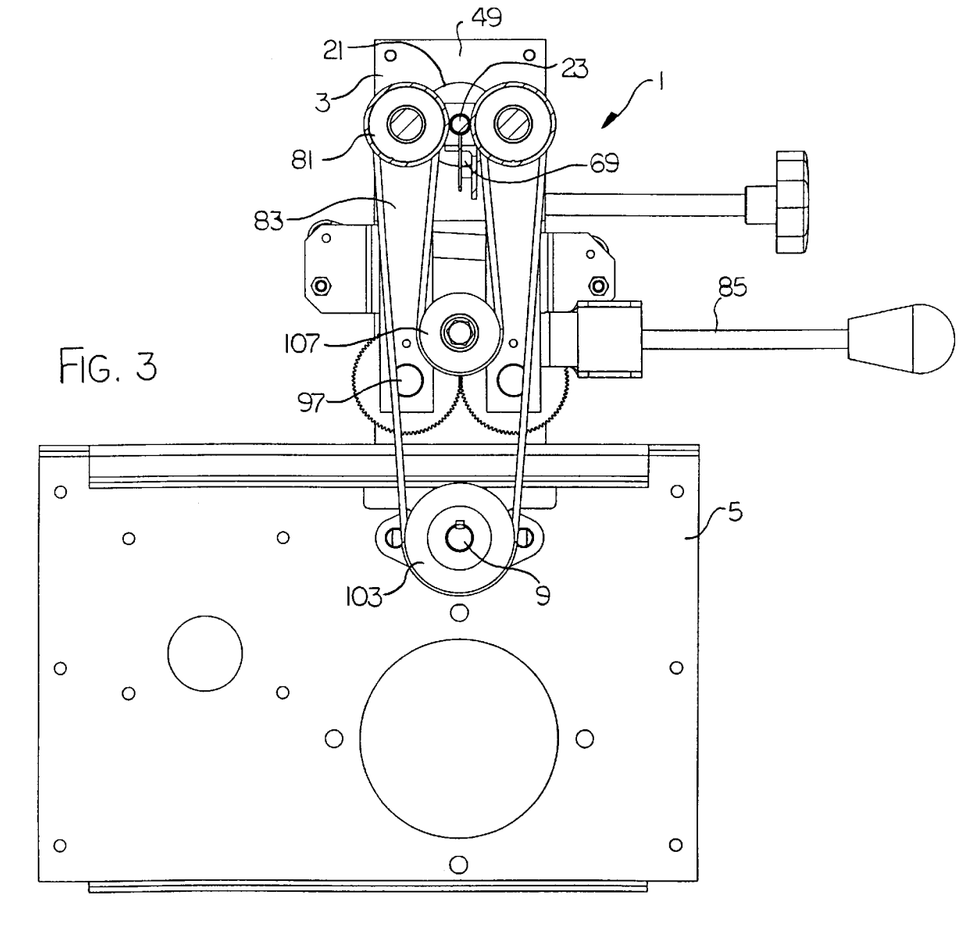
FIG. 3 is a front view of the machine.
Figure 4:
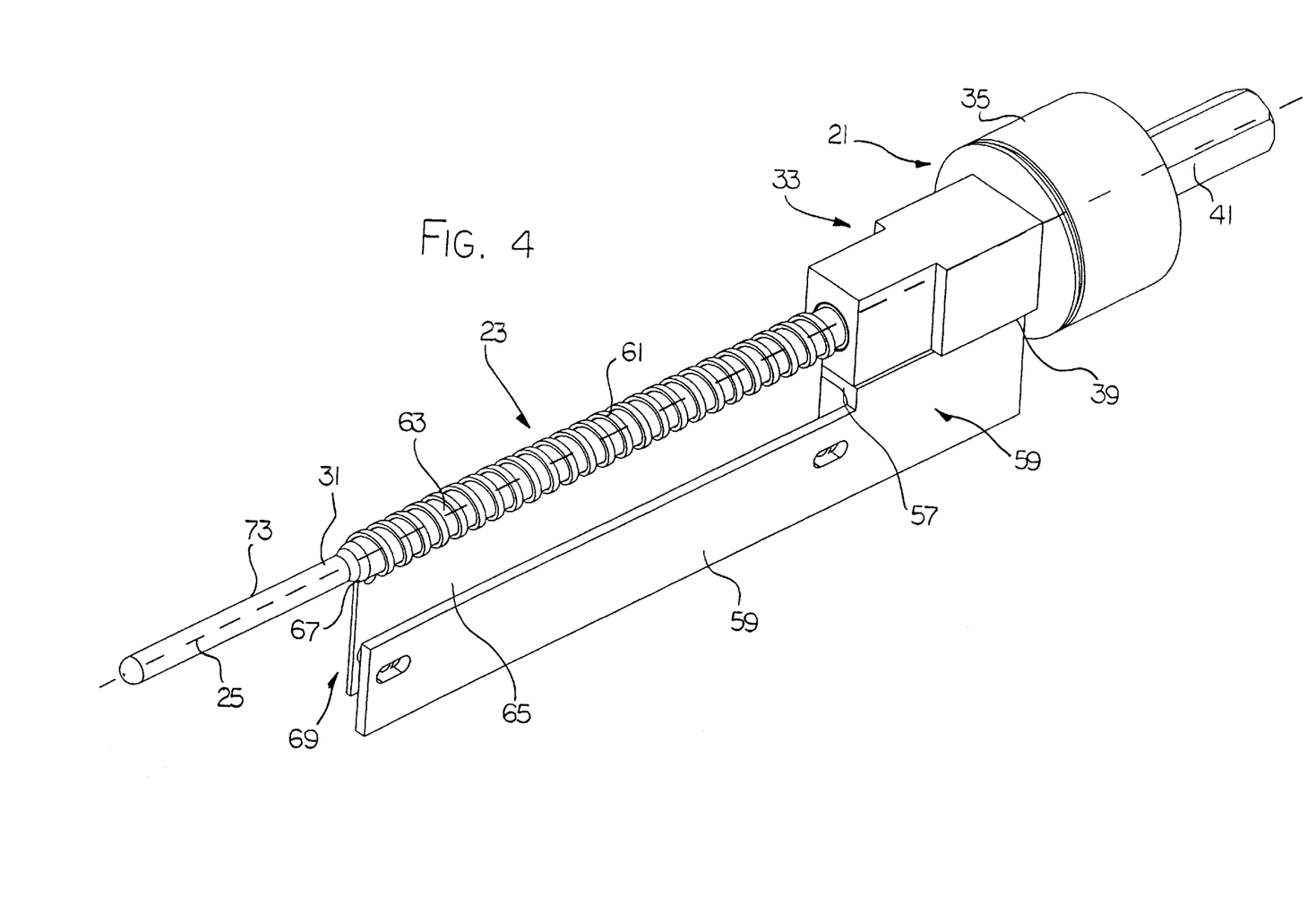
FIG. 4 is an isometric view of the mandrel.
Figure 5:
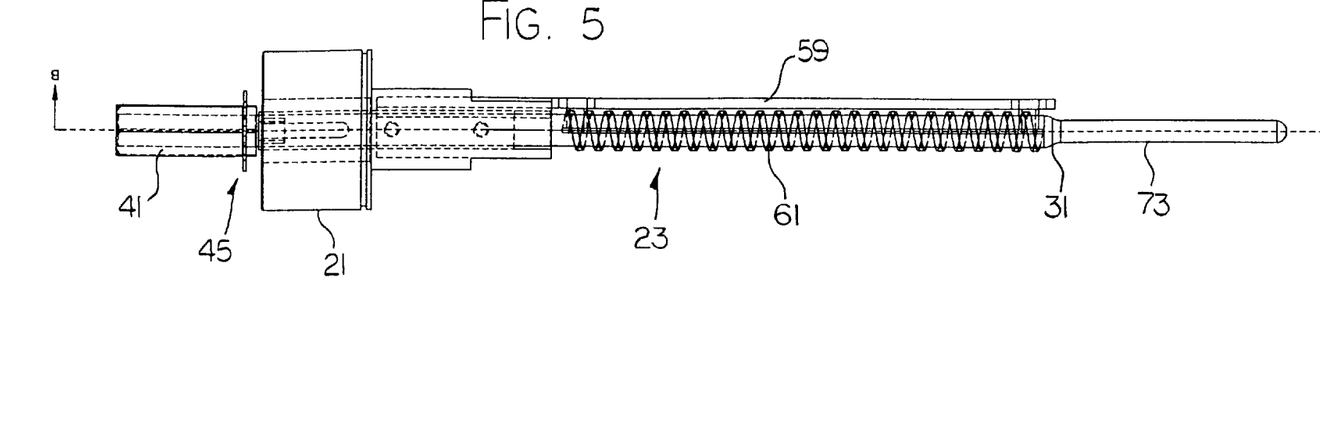
FIG. 5 is a top view of the mandrel.
Figure 6:
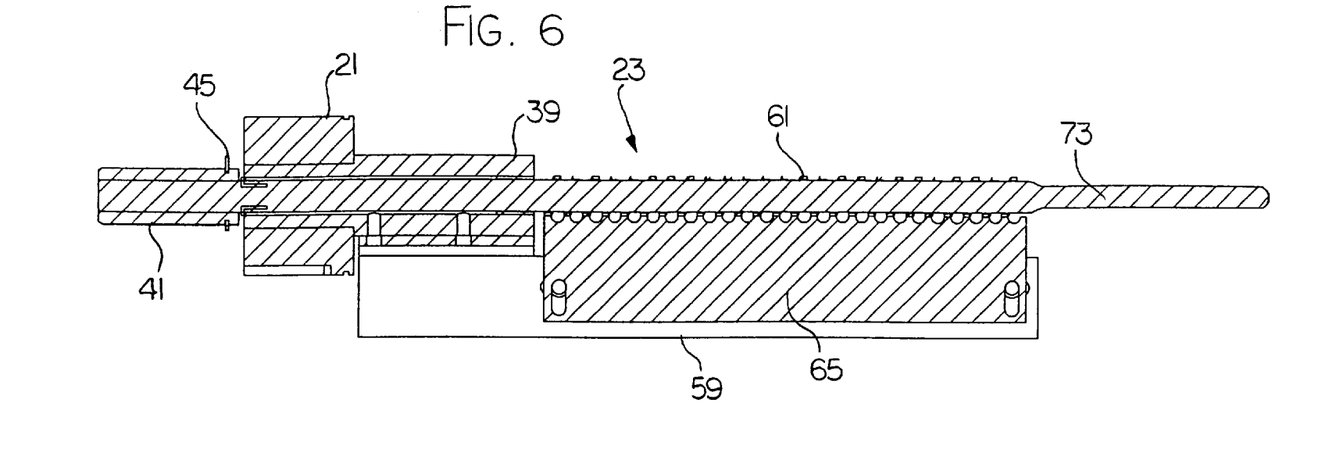
FIG. 6 is a vertical cross section along the lines 6—6 of FIG. 4.

The mandrel, as best shown in FIGS. 4, 5 and 6, is an elongate shaft 31 which extends along the longitudinal axis. The mandrel is mounted to the main body by the mounting boss. The mounting boss is arranged to be inserted into the top end of the main body such that the mandrel is supported along the longitudinal axis parallel to the shaft and supports the mandrel so as to allow rotation of the mandrel while holding the mandrel against longitudinal movement. The mounting boss is arranged such that the mandrel is inserted through a sleeve portion 33 therethrough for support. The mounting boss comprises a brace member 35 which has a diameter larger than the shaft and is coaxial with the shaft and is arranged to allow rotatable movement of the shaft therein. The brace member is located at a first end 37 of the shaft. A sleeve member 39 is mounted on the shaft and is inserted into the brace member for supporting the mandrel therein. A drive portion 41 is coupled to the shaft on a respective side of the brace member and is arranged to receive a pulley mount 43.

The drive portion is located at an outermost end of the shaft. The drive portion is hexagonal in cross section. A shoulder 45 is located at an inner portion of the drive portion for supporting the drive portion within the main body such that the shaft is prohibited from longitudinal movement therein. Adjacent the shoulder of the drive portion is the brace member. The brace member is arranged to be engaged by a clamping mechanism 49 which engages the member about the axis within the main body wherein the shoulder engages an inner side of the member.

At an opposite side of the brace relative to the drive portion on the shaft is the sleeve member. The mandrel is inserted through the mounting boss from an end opposite the drive portion until the shoulder engages the mounting boss to hold the mandrel against longitudinal movement. The sleeve member is mounted on the shaft along the axis and has a insert portion 51 which is inserted through the brace and engages the drive portion. An outer portion of the sleeve member is rectangular in shape and is arranged to provide support for a coil support member 55.

The coil support member is fastened to a bottom side of the outer portion. The coil support has a flange 57 fastened to the outer portion such that the member is fastened at one edge to the outer portion and has a plate portion 59 which extends along the shaft. The plate portion extends outwardly in an off set manner relative to the axis and is spaced from the shaft. The plate portion is arranged to support a stationary helical guide coil 61 which is wrapped around the shaft and defines a helical guide path 63 around the shaft between turns of the guide coil into which path material is guided for setting into a helical shape having a diameter determined by the diameter of the shaft and a pitch determined by the pitch of the guide coil. The stationary helical guide coil is supported to the plate portion by a coil support plate 65. The coil support plate has an edge 67 attached to the turns of the helical guide coil so as to support the helical guide coil along its length within the plate extending outwardly of the axis of the shaft. The coil support plate has a thickness substantially to that of the guide coil allowing it to be welded to the guide coil. The support plate is fastened to the plate portion and is spaced therefrom by spacers 69 which hold the support plate separated from the plate portion for allowing cooling of the support plate for cooling the material being coiled.

The cooling effect is provided by a fan 71 which blows air onto the support plate thereby cooling the material. A discharge end 73 of the shaft past the helical guide coil has a diameter which is less than that of the shaft at the helical guide coil so that the coiled material can be released from the shaft to be cut. The helical guide coil is interchangeable on the shaft such that different pitches for the coil can be achieved on the same diameter shaft. For larger diameter coils the mandrel is replaced with a mandrel with a larger diameter shaft, which has a larger diameter helical guide coil thereon.

A pair of rollers 81 parallel to the axis of the shaft. Each roller is rotatable about a respective longitudinal axis for applying an outer driving force to an outside of the helical coil of plastic material while the material is wrapped around the shaft. The mandrel applies an inner driving force to the inside of the material helically along the mandrel such that the inner and outer forces then to drive the material helically along the mandrel from a supply to the discharge end of the mandrel. Each roller is mounted on an arm 83 which supports the rollers on respective sides of the mandrel. The arms are arranged to rotate inward and outward from the axis of the mandrel such that the rollers can engage and disengage the mandrel respectively. Movement of the arms is activated simultaneously by a pivot lever 85. The pivot lever moves arms that are cushioned by a dampener inwards and outwards between a drive position and a retracted position. The arms are mounted on pivots 97 located below the mandrel to the main body. Each roller is rotated by a series of belts 99 which are driven by a pulley assembly 101. The pulley assembly is driven by the motor. The motor drives a first pulley 103 on the shaft, as mentioned previously, at a variable rate of speed. The ratio of speed of rotation of the mandrel and the rollers is varied using variable speed motor drives and PLC control for different applications. The belts extend upwards to a roller pulley 105 on a respective roller for driving the roller. The belts then extend downwards to a tensioning idler pulley 107 located directly below the mandrel and is mounted to the main body. The belts extend upwards from the tensioning pulley to a roller pulley 105 on a respective roller such that each roller is driven by the pulley assembly for rotation about the axis. The belt provides an endless drive means. The tensioning pulley is solidly mounted to the main body so that when the rollers move inwards or outwards from the mandrel, the tension of the belt is constant. Each pulley has an axis with is parallel to the axis of the mandrel.

In operation, a supply of elongate plastic material is applied to the mandrel. The mandrel is rotated about the axis such that the material is fed along the mandrel within the turns of the guide coil. The rollers which are engaging the mandrel provide pressure to the mandrel so that the material is rolled along the mandrel. The material is applied in a heated state such that the material is resilient and adopts the diameter of the mandrel and the pitch of the guide coil. The fan applies cool air to the material such that the coiled material is permanently formed with the diameter and pitch desired. The rate of rotation of the rollers and the mandrel is in direct ratio to the diameter of the mandrel and to the pitch of the coil guide. The rate of rotation is adjusted by changing the speed ratio of the motors which drive the mandrel and/or rollers respectively.

Figures 7, 8:
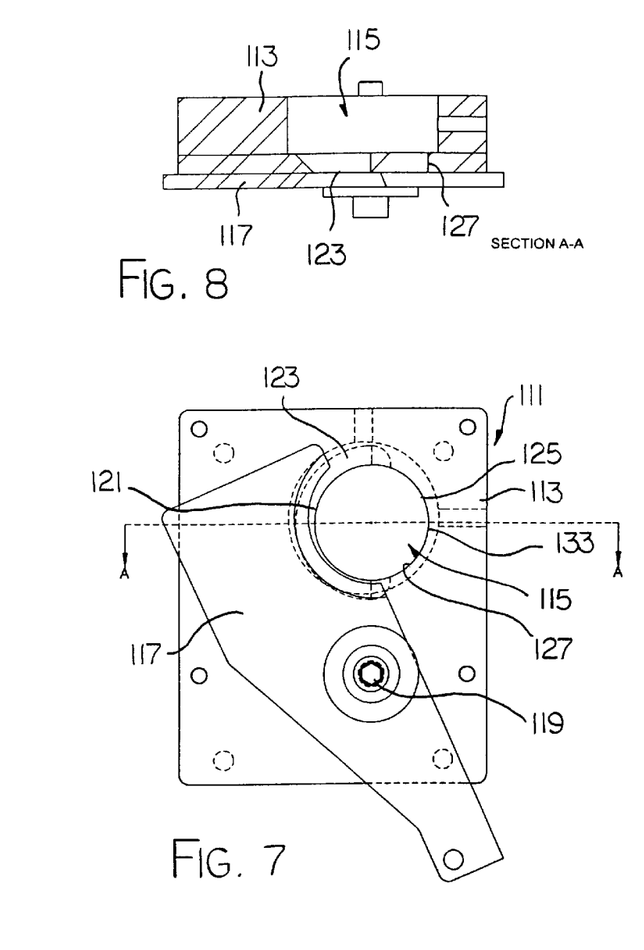
FIG. 7 is a side elevational view of the cutting knife.
FIG. 8 is a horizontal cross section along the lines 8—8 of FIG. 7.
Figure 9:
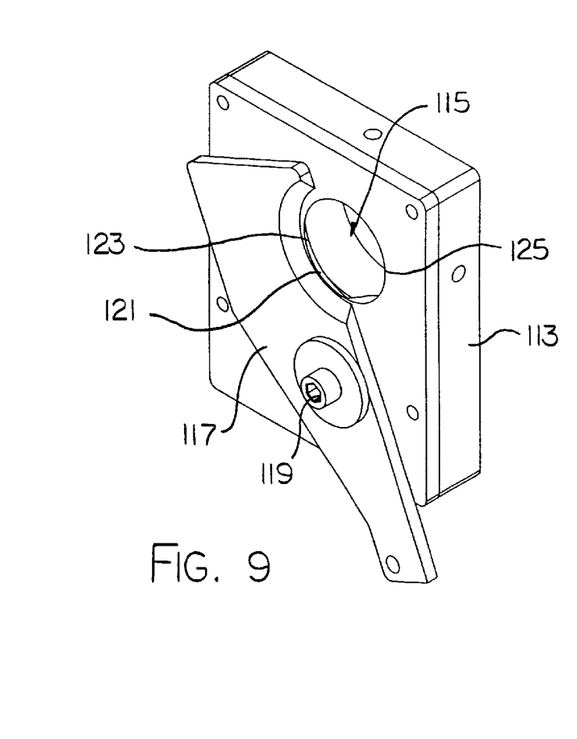
FIG. 9 is an isometric view of the cutting knife.

A knife assembly 111 is arranged to cut the coiled material to a desired length. The knife assembly is positioned at the discharge end of the mandrel. The knife assembly has a main body 113 which has a cylindrical opening 115 for receiving the coiled material. The opening is generally aligned with the axis of the mandrel but not necessarily coaxial thereto. A knife 117 is arranged to move across the opening for cutting the material to a desired length. The knife is mounted on a pivot 119 on the main body below the opening which pivots the knife across the opening from side to side engaging an outer side 133 of the main body. The knife is bevelled of the side away from the main body. The opening has a first portion 121 which has a chamfered edge 123 which is arranged to receive the material such that the material is centred within the opening. A second portion 125 has a flat edge 127 which co-operates with the knife for cutting the material. The knife pushes the material from the chamfered edge whereon the material is centred between each coil towards the flat edge where the material is cut. The material has to be centred such that the cut is located in a desired position between the coils on the material. The flat edge prohibits the material from twisting when cut. The cut material is released onto a tray, not shown, wherein the material is stacked or the like.

Since various modifications can be made in my invention as herein above described, and many apparently widely different embodiments of same made within the spirit and scope, it is intended that all matter contained in the accompanying specification shall be interpreted as illustrative only and not in a limiting sense.

What is claimed is:

1. A machine for forming helical coil from a heated elongate plastics material comprising:
    an elongate cylindrical mandrel onto which the material is wrapped in helical formation which is rotatable about its longitudinal axis;
    a stationary helical guide coil, detached from the mandrel, wrapped around the mandrel and defining a helical guide path around the mandrel between turns of the helical guide coil into which path the material is guided for setting into a helical shape having a diameter determined by the diameter of the mandrel and a pitch determined by the pitch of the helical guide coil;
    at least two drive rollers parallel to the axis of the mandrel which are rotatable each about a respective longitudinal axis for applying an outer driving force to an outside of the helical coil of plastics material while it is wrapped around the mandrel and while the mandrel applies an inner driving force to the inside of the helical coil of plastics material such that the inner and outer forces tend to drive the material helically along the mandrel from a supply to a discharge end of the mandrel;
    a drive coupling member at one end of the mandrel for receiving a drive from a rotatable drive member;
    a mounting boss for supporting the mandrel so as to allow rotation of the mandrel while holding the mandrel against longitudinal movement;
    a coil support plate having one edge attached to the turns of the helical guide coil so as to support the helical guide coil along its length with the plate extending outwardly of the axis of the mandrel;
    and a support member for supporting the coil support plate at positions along its length;
    the coil support plate being readily releasably connected to the support member so that the helical guide coil and the coil support plate can be removed leaving the mounting boss and support member in place for ready replacement of the helical guide coil by a guide coil of a different pitch.

2. The machine according to claim 1 wherein the coil support plate has a thickness substantially equal to that of the guide coil allowing it to be welded to the guide coil.

3. The machine according to claim 1 wherein the coil support plate has a planar width from the edge attached to the coil to an opposed edge to define a cooling fin for applying cooling to the material on the mandrel.

4. The machine according to claim 1 wherein the support member is attached to the coil support plate at an edge opposite to the edge attached to the guide coil.

5. The machine according to claim 1 wherein the support member is attached to the coil support plate by spacer members which hold the support plate separated from the support member for allowing cooling of the support plate.

6. The machine according to claim 1 wherein the support member comprises an elongate bar.

7. The machine according to claim 1 wherein the support member is attached to the mounting boss.

8. The machine according to claim 1 wherein the drive coupling comprises a shaft having a non-circular cross-section insertable into a drive receptacle of corresponding cross-section to receive drive therefrom.

9. The machine according to claim 1 wherein the drive coupling has a shoulder for abutting the mounting boss so that the mandrel is inserted through the mounting boss from the end opposite the drive coupling until the shoulder engages the mounting boss to hold the mandrel against longitudinal movement.

10. The machine according to claim 1 wherein the drive rollers consist of only two drive rollers arranged at opposite sides of the mandrel, each drive roller being mounted for movement between a drive position and a retracted position on a pivot arm with the pivot arms extending to respective pivot axes parallel to the mandrel axis and spaced outwardly from the mandrel to the same side.

11. The machine according to claim 10 wherein the pivot arms are connected for simultaneous rotation about the respective pivot axis.

12. The machine according to claim 10 wherein the drive rollers are driven by a belt arrangement wrapped around both of the drive rollers, around a first pulley and a second pulley lying to the same side as the pivot axes with one pulley inwardly of and one outwardly of the pivot axes such that the rollers can pivot to the retracted position while the belt remains tensioned.

13. The machine according to claim 11 wherein a first of the pivot arms is pivotal by a manually operable pivot lever attached thereto and the second pivot arm is driven from the first.

14. The machine according to claim 1 wherein there is provided an elongate cooling air supply mounted parallel to the mandrel and located at a position so as to direct air in a plane at right angles to a plane containing the drive rollers.

15. A machine for forming helical coil from a heated elongate plastics material comprising:
    an elongate cylindrical mandrel onto which the material is wrapped in helical formation which is rotatable about its longitudinal axis;
    a stationary helical guide coil, detached from the mandrel, wrapped around the mandrel and defining a helical guide path around the mandrel between turns of the helical guide coil into which path the material is guided for setting into a helical shape having a diameter determined by the diameter of the mandrel and a pitch determined by the pitch of the helical guide coil;
    two drive rollers parallel to the axis of the mandrel which are rotatable each about a respective longitudinal axis for applying an outer driving force to an outside of the helical coil of plastics material while it is wrapped around the mandrel and while the mandrel applies an inner driving force to the inside of the helical coil of plastics material such that the inner and outer forces tend to drive the material helically along the mandrel from a supply to a discharge end of the mandrel;

a drive coupling member at one end of the mandrel for receiving a drive from a rotatable drive member;

a mounting boss for supporting the mandrel so as to allow rotation of the mandrel while holding the mandrel against longitudinal movement;

a coil support plate having one edge attached to the turns of the helical guide coil so as to support the helical guide coil along its length with the plate extending outwardly of the axis of the mandrel;

wherein the two drive rollers are arranged at opposite sides of the mandrel, each drive roller being mounted for movement between a drive position and a retracted position on a pivot arm with the pivot arms extending to respective pivot axes parallel to the mandrel axis and spaced outwardly from the mandrel to the same side.

16. A machine for forming helical coil from a heated elongate plastics material comprising:

an elongate cylindrical mandrel onto which the material is wrapped in helical formation which is rotatable about its longitudinal axis;

a stationary helical guide coil, detached from the mandrel, wrapped around the mandrel and defining a helical guide path around the mandrel between turns of the helical guide coil into which path the material is guided for setting into a helical shape having a diameter determined by the diameter of the mandrel and a pitch determined by the pitch of the helical guide coil;

at least two drive rollers parallel to the axis of the mandrel which are rotatable each about a respective longitudinal axis for applying an outer driving force to an outside of the helical coil of plastics material while it is wrapped around the mandrel and while the mandrel applies an inner driving force to the inside of the helical coil of plastics material such that the inner and outer forces tend to drive the material helically along the mandrel from a supply to a discharge end of the mandrel;

a drive coupling member at one end of the mandrel for receiving a drive from a rotatable drive member;

a mounting boss for supporting the mandrel so as to allow rotation of the mandrel while holding the mandrel against longitudinal movement;

a coil support plate having one edge attached to the turns of the helical guide coil so as to support the helical guide coil along its length with the plate extending outwardly of the axis of the mandrel;

and a cutting knife assembly for cutting the helical coil into lengths, the cutting knife assembly having;

a main body positioned at the discharge end of the mandrel opposite the mounting boss;

an opening on the main body facing the mandrel and is aligned with the axis of the mandrel;

an outer edge of the opening facing towards the axis of the mandrel;

a first portion on the outer edge having a chamfered edge for receiving the helical coil such that the helical coil is centred on the outer edge;

a second portion of the outer edge having a flat edge, and;

a cutting member being bevelled on a side facing away from the opening and a second side adjacent the opening;

the cutting member is arranged to move across the opening such that the cutting member forces the helical coil from the first portion to the second portion whereby the helical coil is cut to the desired length.

17. The machine according to claim 16 wherein the cutting member is pivotally mounted to the main body below the opening.

18. The machine according to claim 16 wherein the cutting member moves across the opening from side to side.

* * * * *